(12) United States Patent
Kirkpatrick

(10) Patent No.: US 9,127,731 B2
(45) Date of Patent: Sep. 8, 2015

(54) SYSTEM AND METHOD FOR BRAKE DISK ASSEMBLY

(71) Applicant: Goodrich Corporation, Charlotte, NC (US)

(72) Inventor: Christopher T. Kirkpatrick, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 18 days.

(21) Appl. No.: 13/928,897

(22) Filed: Jun. 27, 2013

(65) Prior Publication Data

US 2015/0001008 A1    Jan. 1, 2015

(51) Int. Cl.

| | |
|---|---|
| *F16D 55/24* | (2006.01) |
| *F16D 55/36* | (2006.01) |
| *F16D 65/00* | (2006.01) |
| *F16D 65/12* | (2006.01) |
| *B64C 25/42* | (2006.01) |
| *F16D 55/00* | (2006.01) |
| *F16D 65/02* | (2006.01) |

(52) U.S. Cl.
CPC ............... *F16D 55/24* (2013.01); *B64C 25/42* (2013.01); *F16D 55/36* (2013.01); *F16D 65/0006* (2013.01); *F16D 65/12* (2013.01); *F16D 2055/0058* (2013.01); *F16D 2065/132* (2013.01); *F16D 2065/1328* (2013.01)

(58) Field of Classification Search
CPC ..... F16D 65/0006; F16D 55/24; F16D 65/12; F16D 55/36; F16D 2065/132; F16D 2065/1328; F16D 2055/0058; B64C 25/42

USPC ............. 188/71.5, 71.6, 73.37, 218 XL; 192/113.31, 113.4, 70.12; 264/610
See application file for complete search history.

(56) References Cited

U.S. PATENT DOCUMENTS

| | | | |
|---|---|---|---|
| 2,675,106 | A | 4/1954 | Foster |
| 3,480,115 | A * | 11/1969 | Lallemant .................... 188/71.5 |
| 3,483,953 | A * | 12/1969 | Bender .................. 188/218 XL |
| 3,548,979 | A * | 12/1970 | Dernovshek et al. ... 188/264 CC |
| 4,358,001 | A * | 11/1982 | Iverson ........................ 188/71.6 |
| 5,143,184 | A * | 9/1992 | Snyder et al. .......... 188/218 XL |
| 5,551,534 | A * | 9/1996 | Smithberger et al. ........ 188/71.5 |
| 5,779,006 | A * | 7/1998 | Hyde et al. ................. 188/250 D |
| 6,086,814 | A * | 7/2000 | Krenkel et al. ............... 264/610 |
| 8,157,062 | B2 * | 4/2012 | Enright et al. ............... 188/71.5 |
| 8,398,796 | B2 * | 3/2013 | Kuenzler et al. ........... 156/89.11 |
| 2004/0112688 | A1 | 6/2004 | Rancourt |
| 2010/0000070 | A1 * | 1/2010 | La Forest et al. .......... 29/525.06 |

(Continued)

FOREIGN PATENT DOCUMENTS

| | | |
|---|---|---|
| DE | 19858260 | 6/2000 |
| EP | 2749785 | 7/2014 |

(Continued)

OTHER PUBLICATIONS

Extended European Search Report dated Nov. 3, 2014 in European Application No. 14165644.7.

*Primary Examiner* — Thomas J Williams
*Assistant Examiner* — Mariano Sy
(74) *Attorney, Agent, or Firm* — Snell & Wilmer LLP

(57) ABSTRACT

Systems and methods disclosed herein may be useful for use in a disk brake assembly. In this regard, a disk brake system may comprise a combination of split friction disk assemblies and solid disk assemblies. These split friction disk assemblies and/or solid disk assemblies may be arranged together in any suitable pattern or position.

17 Claims, 8 Drawing Sheets

(56) References Cited

U.S. PATENT DOCUMENTS

2013/0112514 A1* 5/2013 Hanna et al. ............ 188/218 XL
2014/0174863 A1* 6/2014 Kirkpatrick et al. .... 188/218 XL

FOREIGN PATENT DOCUMENTS

GB          2444927     6/2008
WO    WO 8000735 A1 *   4/1980

* cited by examiner

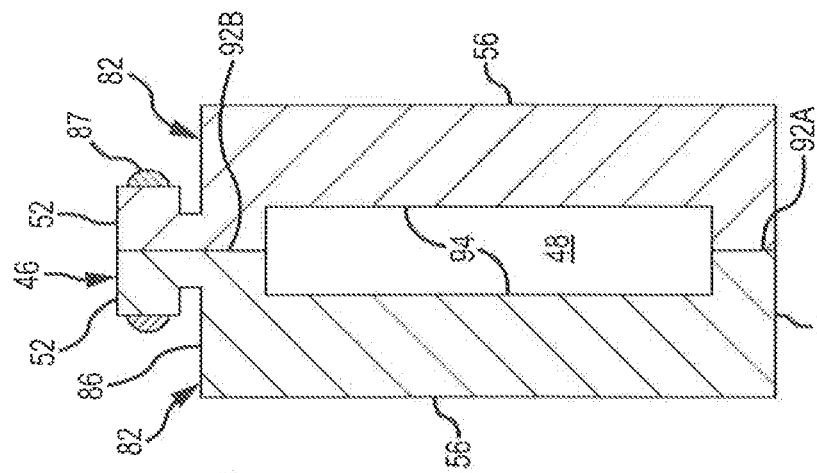
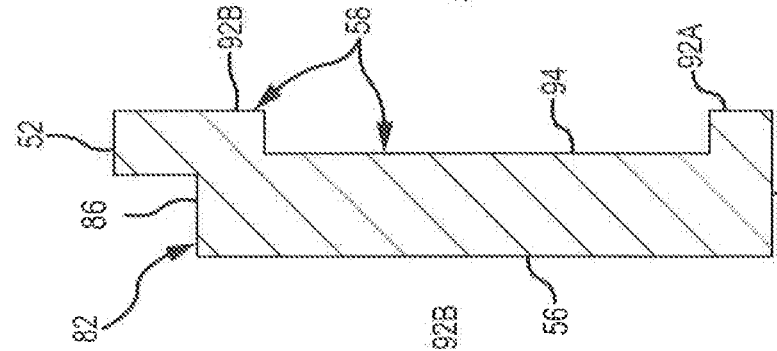
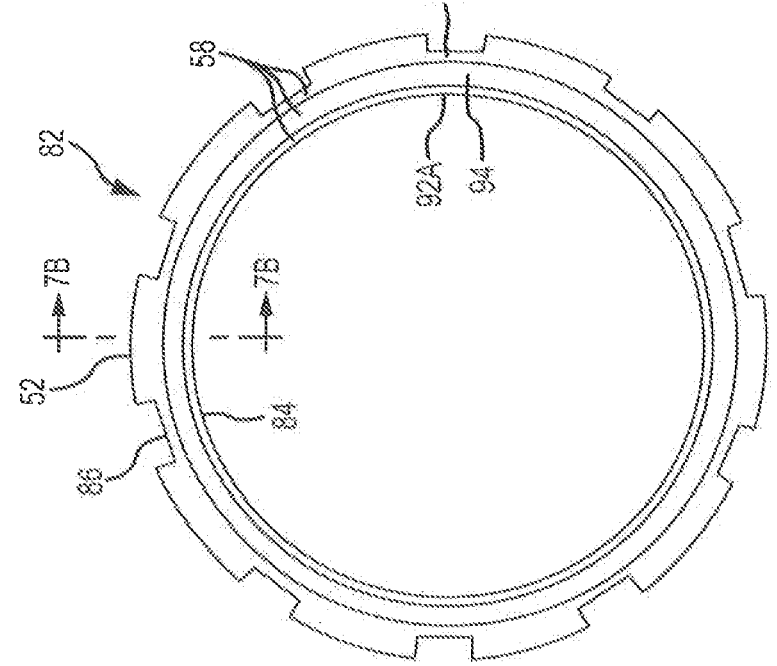
FIG. 7A
FIG. 7B
FIG. 7C

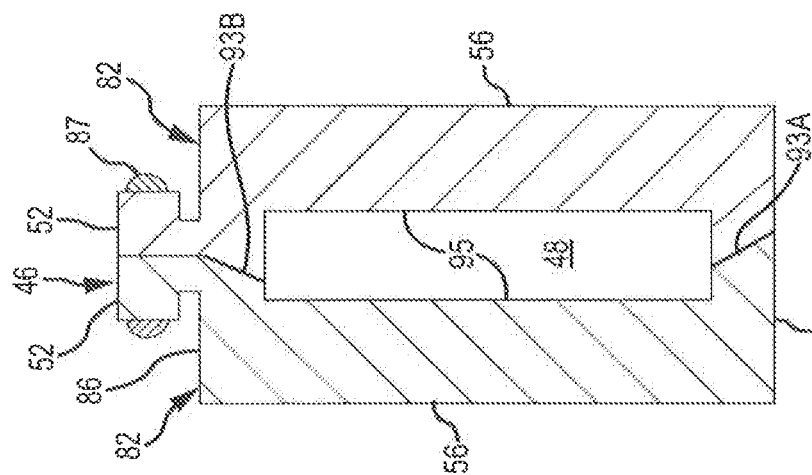
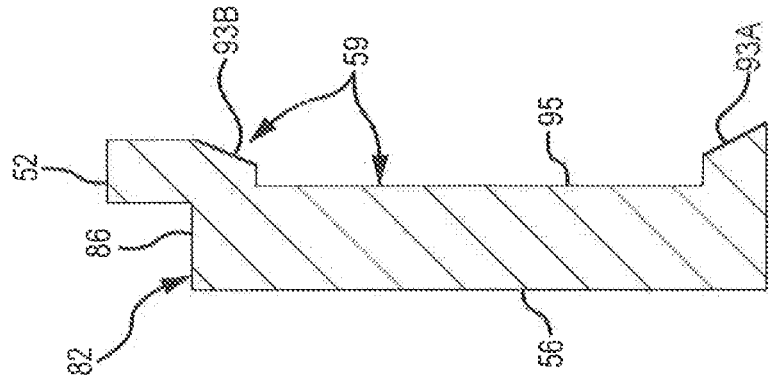
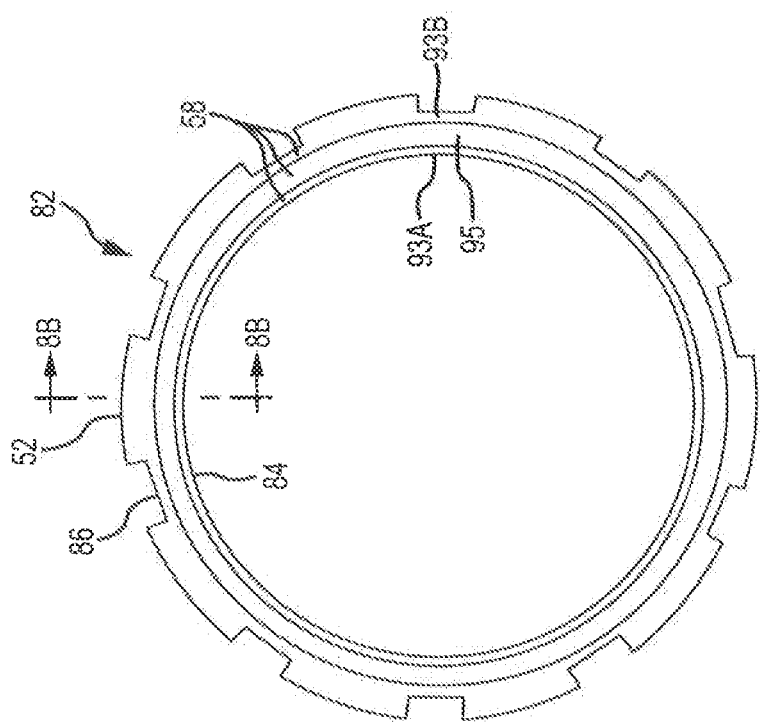

SYSTEM AND METHOD FOR BRAKE DISK ASSEMBLY

FIELD

The present disclosure relates to aircraft braking systems. in particular, the disclosure relates to a brake disk assembly of an aircraft braking system.

BACKGROUND

Aircraft brake systems typically employ a series of friction disks that, when forced into contact with each other, help to stop the aircraft. Friction disks splined to a non-rotating wheel axle are interspersed with friction disks splined to the rotating wheel. The friction disks are configured to withstand and dissipate the heat generated from contact between the friction disks during braking. Due to high speed landings and rejected takeoffs ("RTO"), over time, the amount of heat generated can he enough to destroy friction disks formerly made of commonly used materials, such as steel. Carbon composite materials are better suited for high temperature use and are now the standard for friction disks in aircraft brake assemblies. However, carbon composite disks have a tendency to vibrate in use and may generate significant brake noise,

SUMMARY

The present disclosure relates to an improved braking system assembly designed to address, among other things, the aforementioned deficiencies in prior art braking systems. According to various embodiments, a disk brake assembly may include a pressure plate, a plurality of stator friction disks, a plurality of rotor friction disks, and an end plate. At least one of the rotor friction disks and the stator friction disks may he a split friction disk having an open cavity therein, At least one of the rotor friction disks and the stator friction disks is a solid friction disk. The solid friction disk and/or the split friction disk may be located in any position within the brake assembly. Thus, the layout of split friction disks and/or solid friction disks within the heatsink may take any suitable form.

The split friction disk further may be an annular-shaped disk half including a friction surface and a non-friction surface. The non-friction surface may be on a side opposite of the friction surface. The non-friction surface may include a contact surface and a non-contact surface recessed from the contact surface.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

FIGS. 7A-7C illustrate an axial side view and cross-sectional views of a split friction disk half and disk assembly in accordance with various embodiments; and FIGS, 8A-8C illustrate an axial side view and cross-sectional views of a split friction disk half and disk assembly in accordance with various embodiments.

DETAILED DESCRIPTION

Figure 1:
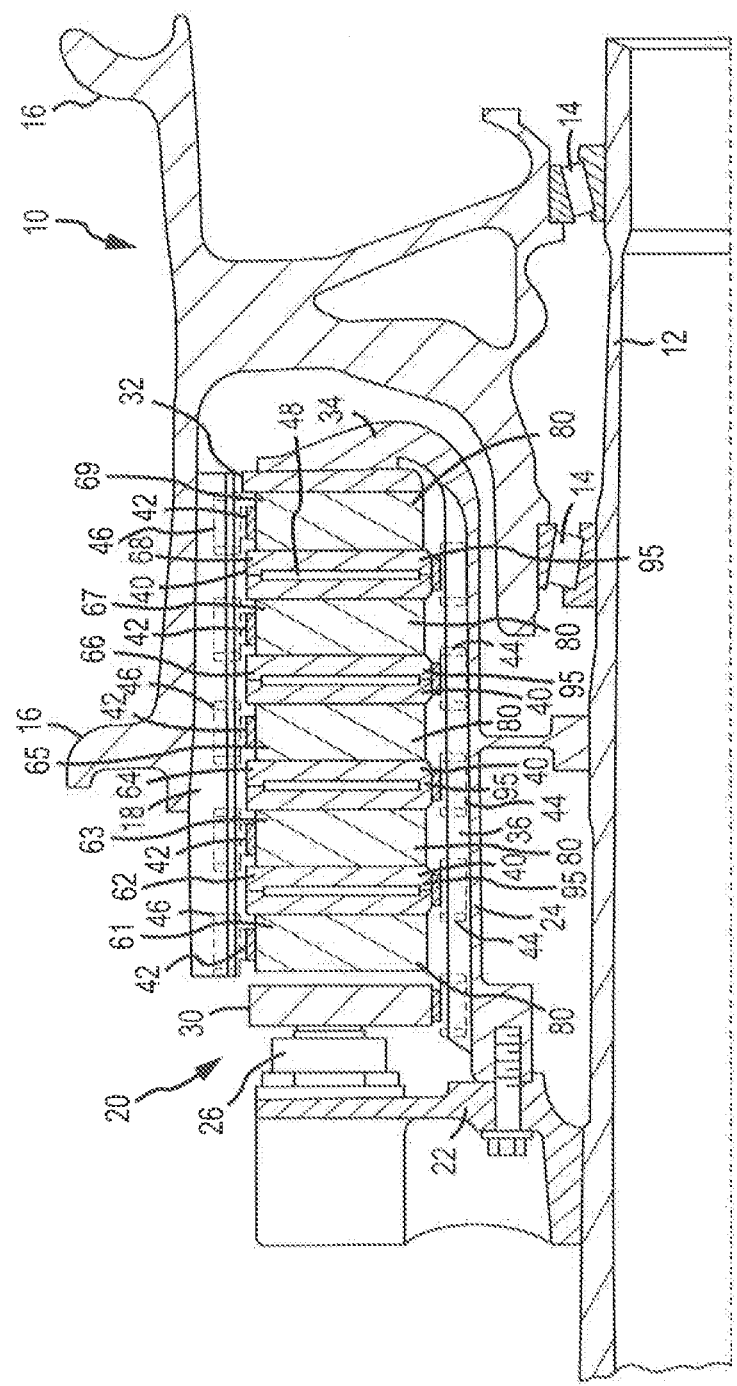
FIG. 1 illustrates a partial cross-sectional view of brake assembly in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation, For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A disk brake system may comprise a combination of split friction disk assemblies and solid disk assemblies. These split friction disk assemblies and/or solid disk assemblies may be arranged together in any suitable pattern or position. According to various embodiments, the braking systems described herein employ carbon composite disks that suffer less vibration and generate less brake noise than conventional carbon composite disks braking systems.

A disk brake system may comprise an annular-shaped disk half of a split friction disk assembly. The disk half may comprise a friction surface and a non-friction surface. The friction surface may be located at an axial end of the disk half. The non-friction surface may he located at an axial end of the disk half on a side generally opposite of the friction surface. The non-friction surface includes a contact surface and a non-contact surface. The non-contact surface may be recessed from the contact surface.

As mentioned above, a disk brake system may comprise a split friction disk for a disk brake system that includes two disk halves. Each of the two disk halves includes a circumferentially extending recess on an axial side of the disk opposite a friction side. The two disk halves are assembled into a split friction disk such that their recesses face each other, forming a cavity. Non-friction surfaces where the disk halves contact each other are in physical contact, but do not form a continuous structure. While not intending to he bound by theory, this structural discontinuity at the contact surfaces may serve to damp vibration, in addition, the cavity limits the area of contact between the halves, which also greatly damps vibration. Additionally, the cavity within the split friction disk may reduce brake noise of the system. According to various embodiments, improved braking performance under certain conditions and decreased variability in braking performance may be achieved, According to various embodiments, and with reference to FIG. 1, a cross-sectional view of wheel 10 supported for rotation around axle 12 by bearings 14 is depicted. Wheel 10 includes rims 16 for supporting a tire and a series of axially extending rotor splines 18 (one shown), Rotation of wheel 10 is modulated by disk brake system 20, Disk brake system 20 includes torque flange 22, torque tube 24, a plurality of pistons 26 (one shown), pressure carbon disk 30, and end plate 32. Torque tube 24 is an elongated annular structure that includes reaction plate 34 and a series of axially extending stator splines 36 (one shown). Reaction plate 34 and stator splines 36 may be integral with torque tube 24 as shown in FIG. 1, or attached as separate components.

Figure 2:
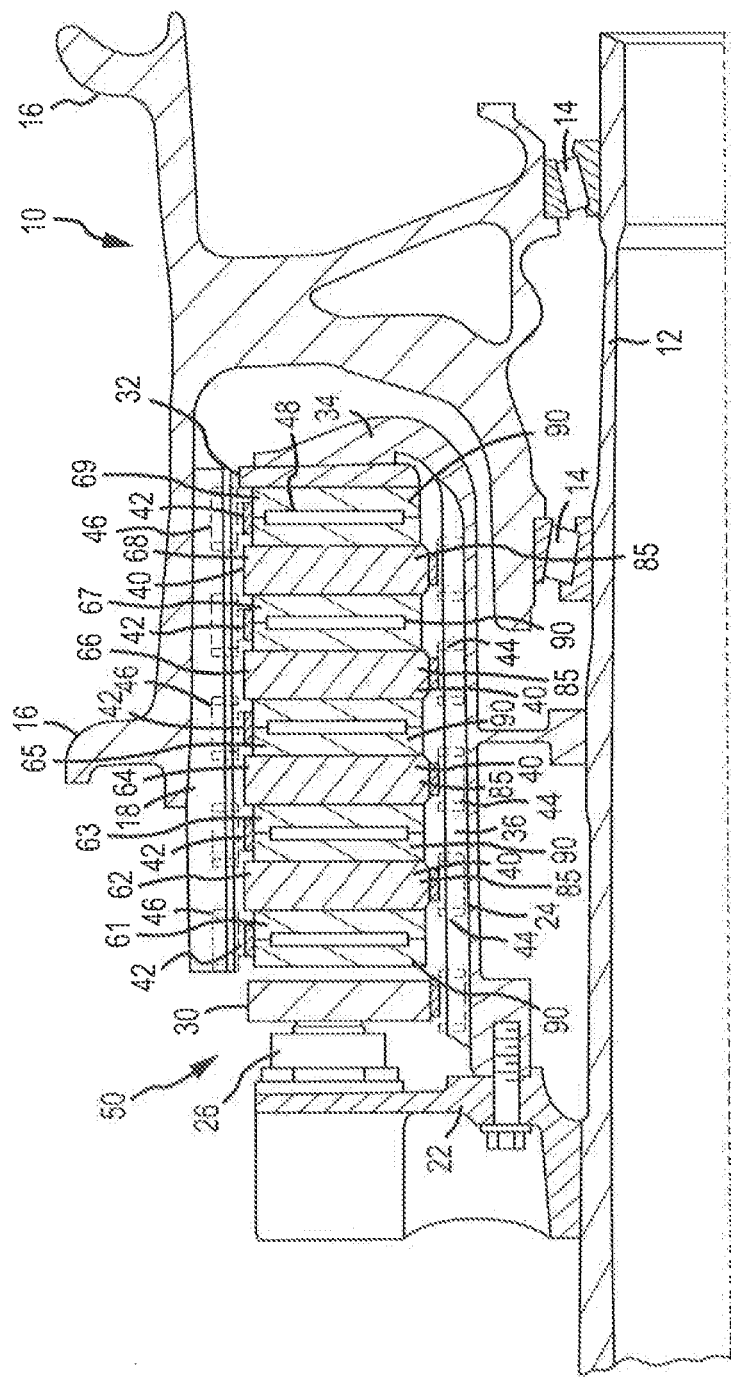
FIG. 2 illustrates a partial cross-sectional view of brake assembly in accordance with various embodiments.

Disk brake system 20 also includes at least one split friction disk 90, 95 (and/or disk assembly) and at least one solid disk 80, 85 (and/or solid disk assembly) (split friction disk 95 and solid disk 80 are initially depicted in FIG. 1 while split friction disk. 90 and solid disk 85 are initially depicted in FIG. 2). The split friction disks 90, 95 may be a non-rotatable friction disk 40, or a rotatable friction disk 42. The solid friction disks 80, 85 may be a non-rotatable, friction disk 40, or a rotatable friction disk 42. Solid friction disks 80, 85 have no cavity 48, At times a neon-rotatable friction disk 40 (such as disks 85, 95) may be referred to as a stator friction disk, At times a rotatable friction disk 42 (such as disks 80, 90) may be referred to as a rotor friction disk. Each split friction disk assembly 90, 95 and/or solid disk assembly 80, 85 includes an attachment structure. In the embodiment of FIG. 1, each of four non-rotatable friction disks 40 include a plurality of lugs 44 at circumferentially spaced positions around non-rotatable friction disk 40 as an attachment structure. Similarly, each of five rotatable friction disks 42 include a plurality of lugs 46 at circumferentially spaced positions around rotatable friction disk 42 at an attachment structure. The disk brake systems contemplated herein may have any number of rotatable friction disks 42 and/or non-rotatable friction disks 40, such as 5,4; 4,3; and 3,2 respectively, For convenience, the friction disks positioning referred to herein are labeled 61, 62, 63, 64, 65, 66, 67, 86, and 69 from the pressure carbon disk 30 to the end plate 32, For instance, position 61 is adjacent to the pressure carbon disk 30 while position 69 is adjacent to the end plate 32, Each split friction disk 90, 95 also includes cavity 48, In the embodiment of FIG. 1, pressure carbon disk 30, end plate 32, solid friction disks 80, 85 and split friction disks 90, 95 are all generally annular structures made of a carbon composite material.

Torque flange 22 is mounted to axle 12. Torque tube 24 is bolted to torque flange 22 such that reaction plate 34 is near an axial center of wheel 10, End plate 32 is connected to a surface of reaction plate 34 facing axially away from the axial center of wheel 10. Thus, end plate 32 is non-rotatable by virtue of its connection to torque tube 24. Stator splines 36 support pressure carbon disk 30 so that pressure carbon disk 30 is also non-rotatable. Stator splines 36 also support non-rotatable friction disks 40. Non-rotatable friction disks 40 engage stator splines 36 with gaps formed between lugs 44. Similarly, rotatable friction disks 42 engage rotor splines 16 with gaps formed between lugs 46. Thus, rotatable friction disks 42 are rotatable by virtue of their engagement with rotor splines 18 of wheel 10.

As shown in FIG. 1, rotatable friction disks 42 are arranged with end plate 32 on one end, pressure carbon disk 30 on the other end, and non-rotatable friction disks 40 interleaved so that rotatable friction disks 42 are adjacent to non-rotatable friction components. Pistons 26 are connected to torque flange 22 at circumferentially spaced positions around torque flange 22. Pistons 26 face axially toward wheel 10 and contact a side of pressure carbon disk 30 opposite rotatable friction disks 42. Pistons 26 may be powered electrically, hydraulically, or pneumatically.

With continued reference to FIG. 1 and disk brake system 20, positions 61, 63, 65, 67, and 69, the rotatable friction disks 42, may comprise solid friction disks 80, Positions 62, 64, 66, 68, the non-rotatable friction disks 40, may comprise split friction disks 95.

While not intending to be bound by theory, post RTO inspection has shown that outer disk positions (e.g. 61, 62, 63, 67, 68, and 69) of a heatsink (e.g. the system of rotatable friction disks 42 and non-rotatable friction disks 40) tend to be more prone to non-uniform RIO pressure concentrations. Utilization of split friction disks 90, 95 having a cavity 48 within may be effective in minimizing this and other pressure concentrations. Thus, locating split friction disks 90, 95 having. a cavity 48 within various rotor (rotatable friction disks 42) and stator (non-rotatable friction disks 40) locations such as all rotor and stator locations and/or a subset of rotor and/or stator locations creates a vibration damping effect.

According to various embodiments and with reference to FIG. 2, disk brake system 50 is illustrated. With respect to FIGS. 2-6, elements with the like element numbering as depicted in FIG. 1, are intended to be the same and will not be repeated for the sake of clarity. With continued reference to FIG. 2 and disk brake system 50, positions 61, 63, 65, 67, and 69, the rotatable friction disks 42, may comprise split friction disks 90 having a cavity 48. Positions 62, 64, 66, 68, the non-rotatable friction disks, may comprise solid friction disks 85.

Figure 3:
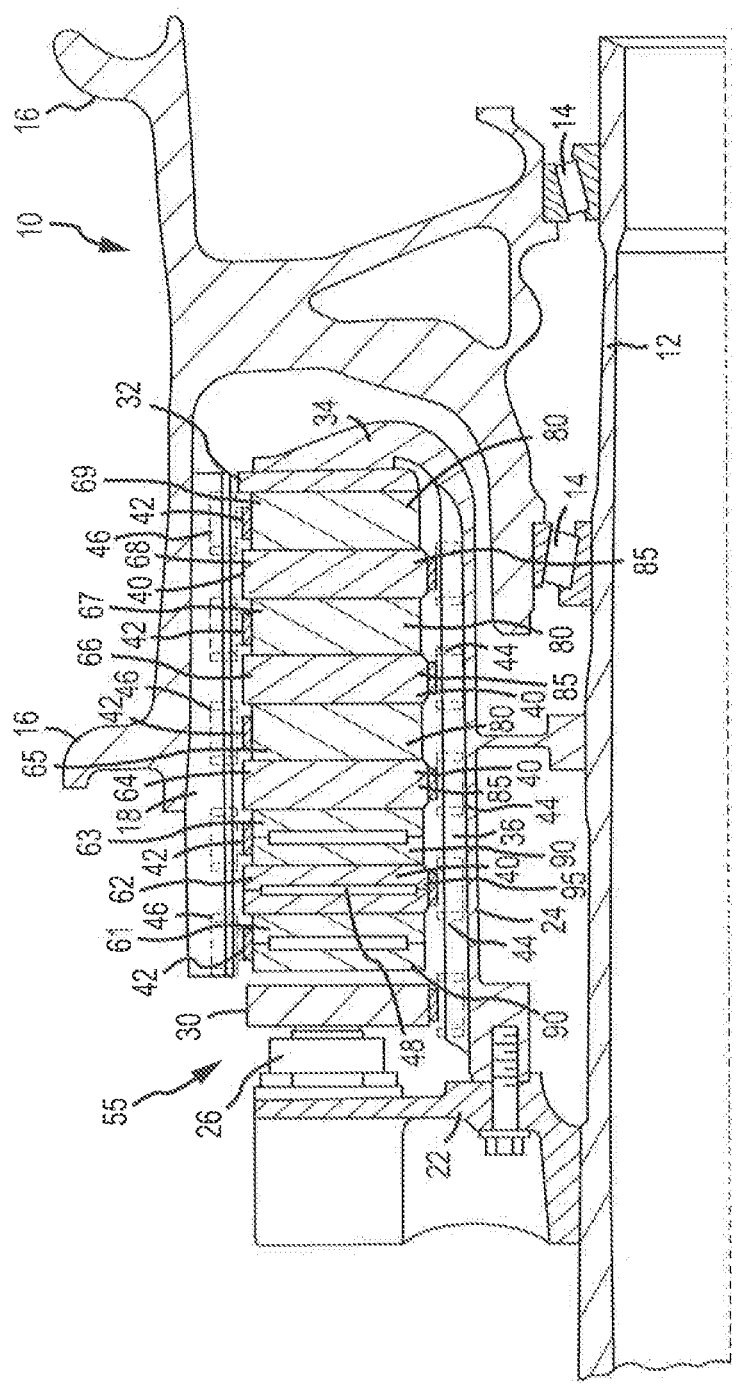
FIG. 3 illustrates a partial cross-sectional view of brake assembly in accordance with various embodiments.

With reference to FIG. 3, disk brake system 55 is illustrated. Positions 61, 62, and 63 may comprise split friction disks 90, 95, 90 respectively. Positions 64, 65, 66, 67, 68 and 69 may comprise solid friction disks 85, 80, 85, 80, 85, 80 respectively.

Figure 4:
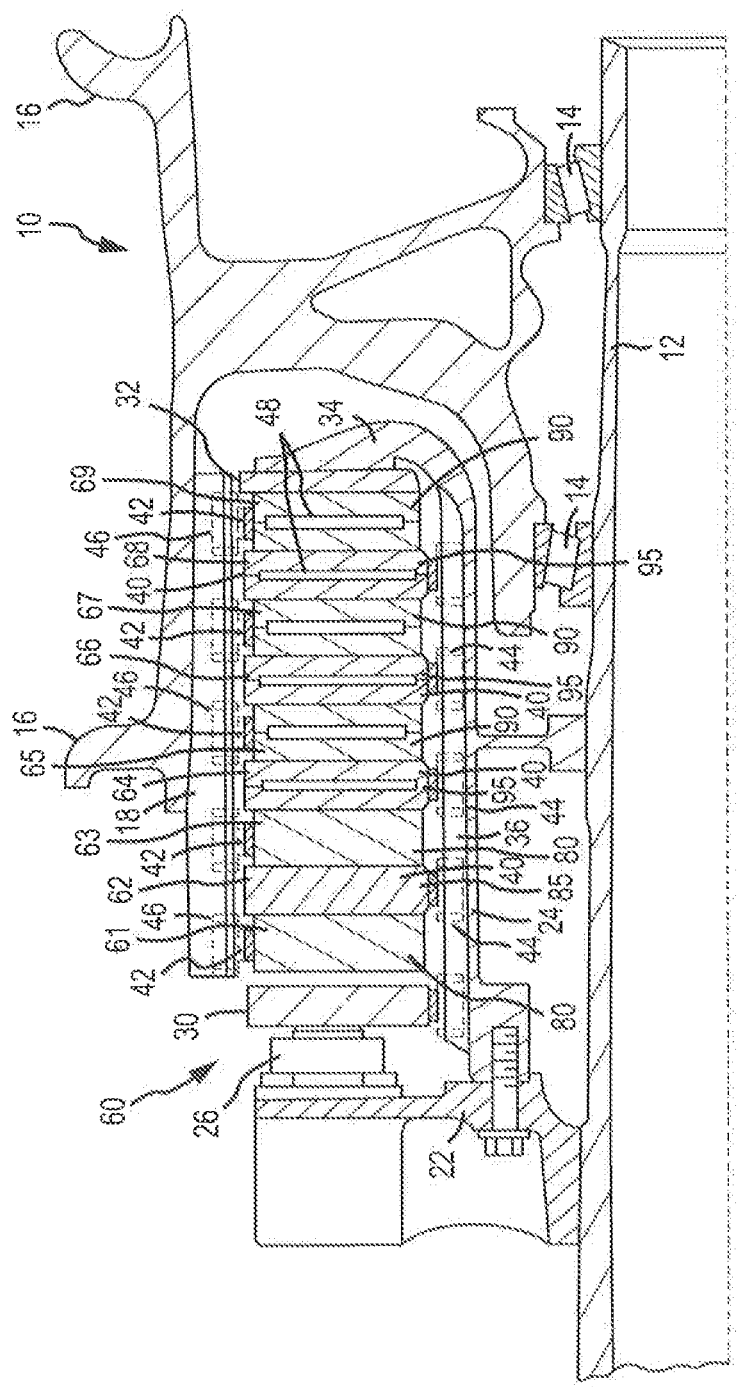
FIG. 4 illustrates a partial cross-sectional view of brake assembly in accordance with various embodiments.

With reference to FIG. 4, disk brake system 60 is illustrated. Positions 61, 62, and 63 may comprise solid friction disks 80, 85, 80 respectively. Positions 64, 65, 66, 67, 68 and 69 may comprise solid friction disks 95, 90, 95, 90, 95, 90 respectively.

As previously noted, outer disk positions of a heatsink tend to be more prone to non-uniform RTO pressure concentrations. RTO performance variation and reduced RTO performance may also occur due to a variety of friction mechanisms in carbon composite material. Thus, with respect to FIGS. 3 and 4 and disk brake systems 55 and 60, RIO performance improvements will get proportionally more benefit from placing the split friction disks 90, 95 having a cavity 48 therein in the first heatsink disk positions near and/or adjacent to the pressure plate/pressure carbon disk 30, and/or near and/or adjacent to the end plate 32.

Figure 5:
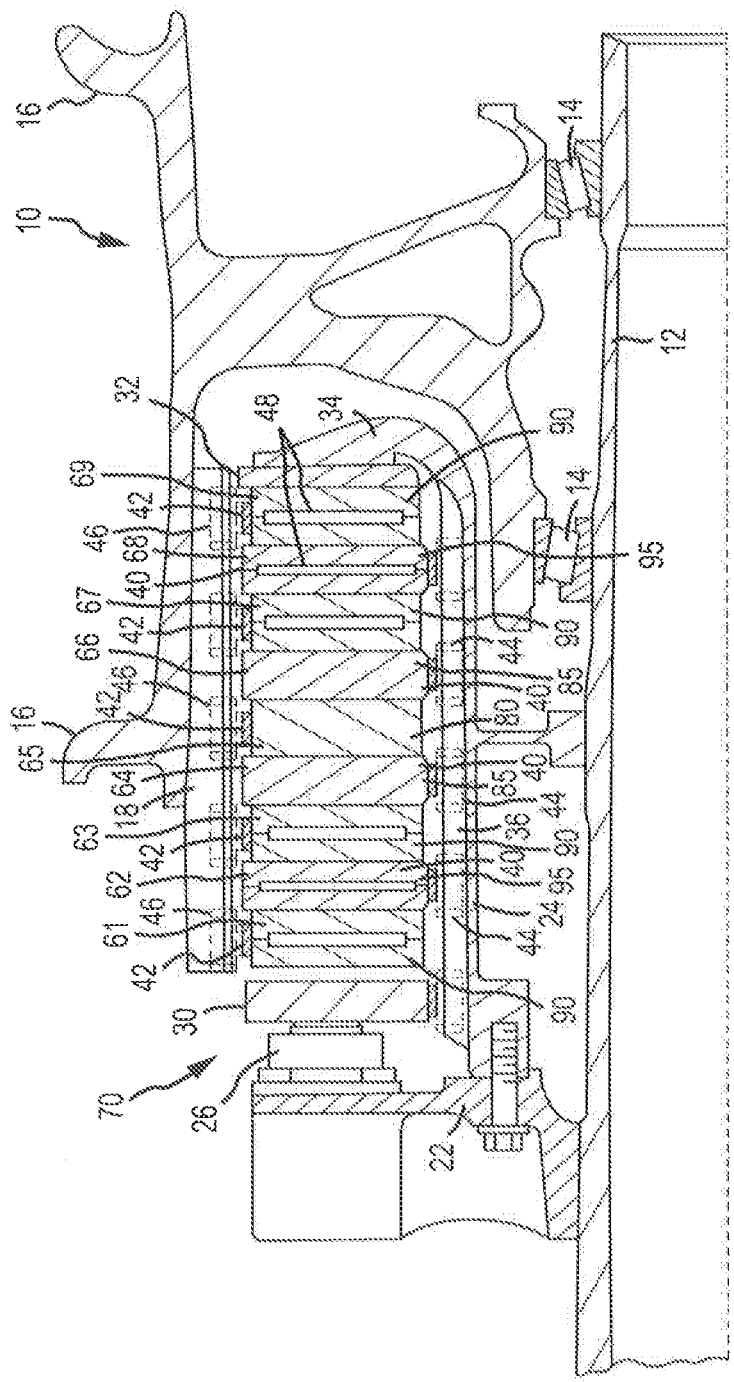
FIG. 5 illustrates a partial cross-sectional view of brake assembly in accordance with various embodiments.

For instance, according to various embodiments and with reference to FIG. 5, disk brake system 70 is illustrated. Positions 61, 62, and 63 may comprise split friction disks 90, 95, 90 respectively, Positions 64, 65, 66, may comprise solid friction disks 85, 80, 85, respectively. Positions 67, 68, and 69 may comprise split friction disks 90, 95, 90 respectively, in this way, split friction disks 90, 95 having a cavity 48 therein are located in the first heatsink disk positions near and/or adjacent to the pressure plate/pressure carbon disk 30, and/or near and/or adjacent to the end plate 32.

Figure 6:
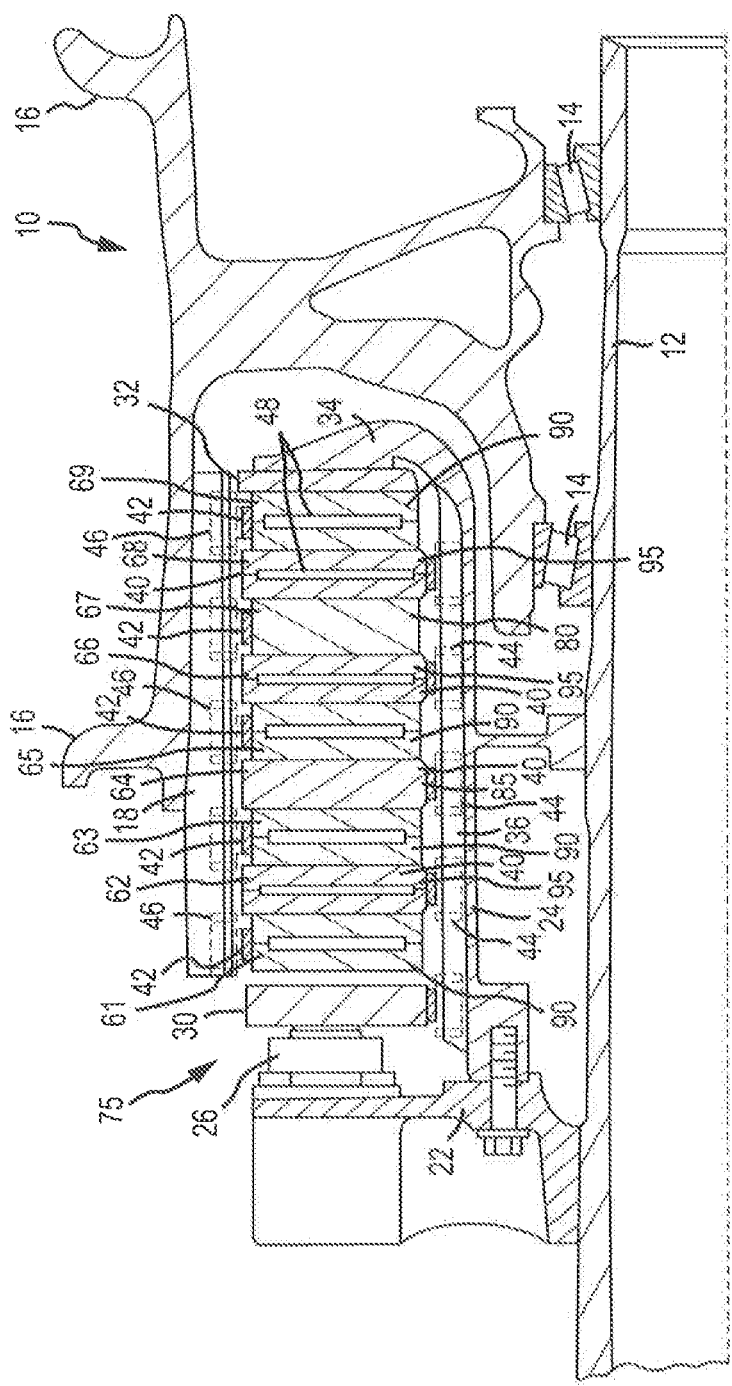
FIG. 6 illustrates a partial cross-sectional view of brake assembly in accordance with various embodiments.

With reference to FIG. 6, disk brake system 75 is illustrated, Positions 61, 62, and 63 may comprise split friction disks 90, 95, 90 respectively, Position 64, may comprise solid disk 85. Positions 65 and 66 may comprise split friction disks 90, 95. Position 67, may comprise solid disk 80. Positions 68 and 69 may comprise split friction disks 95 and 90 respectively. Vibration is often a very location dependent phenomenon within a heatsink, so locating split friction disks 90, 95 having a cavity 48 in a suitable position in a heatsink may provide a vibration damping effect. Thus, based on the location of split friction disks 90, 95 having a cavity 48 "tunes" the damping characteristics of a heatsink/disk brake system.

With reference to FIGS. 7A-7C, an example of split friction disk 90, which is a rotatable friction disk 42, is depicted. FIG. 7A shows an axial side view of disk half 82 of rotatable friction disk 42. FIG. 7B shows a cross-sectional view of disk half 82. FIG. 7C shows a cross-sectional view of rotatable friction disk 42. Considering FIGS. 7A-7C together, split friction disk 90 which is a rotatable friction disk 42 includes two disk halves 82. Each disk half 82 includes an attachment structure in the form of lug half, friction surface 56, and non-friction surface 58. Friction surface 56 may be at an axial end of disk half 82. Friction surface 56 may be configured for operationally engaging a corresponding friction surface of another disk brake system component, such as a non-rotatable friction disk 40. Non-friction surface 58 may be located at an axial end of disk half 82, such as on a side opposite of friction surface 56. Non-friction surface 58 includes contact surface 92A, 92B and non-contact surface 94. Non-contact surface 94 is recessed from contact surface 92A, 92B and, in this embodiment contact surface 92A; 9213 is substantially parallel to non-contact surface 94, Contact surface 92A, 92B may be configured for contacting a non-friction surface of another disk brake system component.

Disk half 82 further includes inner diameter surface 84 and outer diameter surface 86. Inner diameter surface 84 may be located at a radially inward facing edge of disk half 82, Outer diameter surface 86 may be located at a radially outward facing edge of disk half 82. Friction surface 56 and non-friction surface 58 extend radially between inner diameter surface 84 and outer diameter surface 52, Contact surface 92A, 92B may be parallel to friction surface 56 and include inner diameter portion 92A and outer diameter portion 92B, Inner diameter portion 92A may be radially between non-contact surface 94 and inner diameter surface 84. Outer diameter portion 92B may be radially between non-contact surface 94 and outer diameter surface 52. Non-contact surface 94 may be radially between inner diameter surface 84 and outer diameter surface 86. Non-contact surface 94 extends circumferentially around at least a portion of disk half 82. As shown in FIG. 7A, non-contact surface 94 extends circumferentially around the entirety of disk half 82 to form a complete annulus. According to various embodiments and with momentary reference to FIGS. 8A-8C, the surface of the noncontact surface, may not be parallel to the surface of friction surface as further described below.

Each disk half 82 may include an attachment structure in the form of lug half Lug half may project radially outward from outer diameter surface 86, As shown in FIG. 7C, disk halves 82 are assembled such that their respective contact surfaces 92A, 92B are in physical contact to form rotatable friction disk 42. Disk halves 82 may be secured to each other by a fastening device. In this embodiment, the fastening device is rivet 87. Once assembled, rotatable friction disk 42 includes cavity 48 formed by the recessed non-contact surfaces 94 of the two disk halves 82. Importantly, while the corresponding contact surfaces 92A, 92B of the two disk halves 82 are held in physical contact, they do not form a continuous structure. That is, the corresponding contact surfaces 92A, 92B are not bonded to each other in any way, but merely held together.

Although the embodiment of FIGS. 7A-7C is described in terms of rotatable friction disk 42, it is understood that the same description and features apply generally to either type of split friction disk 90, 95 and thus, to non-rotatable friction disk 40, except that lug 46 at outer diameter surface 86 is replaced by lug 44 at inner diameter surface 84.

Considering FIGS. 1, and 7A-7C together, prior to operation of disk brake system 20, pistons 26 are not actuated and gaps exist between each of rotatable friction disks 42 and each of the non-rotatable friction components, namely pressure carbon disk 30, end plate 32, and non-rotatable, friction disks 40. The gaps are formed by the axial spreading out of the rotatable friction disks 42 along rotor splines 18; and the non-rotatable friction disks 40, and pressure carbon disk 30 along stator splines 36 due to the movement of rotatable friction disks 42 adjacent to the non-rotatable friction components. During operation of disk brake system 20, pistons 26 are actuated, forcing pressure carbon disk 30 to move along stator splines 36 against the plurality of split friction disks 90 and/or solid friction disks 80, forcing them axially toward end plate 32 and reaction plate 34. Squeezed between pressure carbon disk 30 and reaction plate 34, the gaps are eliminated as friction surfaces contact other friction surfaces. Drag generated by the contact of the friction surfaces acts to slow rotatable friction disks 42 and wheel 10. The drag also generates significant heat Which is absorbed by split friction disks 90, 95 and/or solid friction disks 80, 85 of disk brake system 20.

Brake vibration is significantly damped by split friction disks 90, 95, Split friction disks 90, 95 are assembled from two disk halves 82 such that their corresponding respective contact surfaces 92 are in physical contact, but do not form a continuous structure. Thus, vibration is damped at contact surfaces 92, even though brake pressure is satisfactorily transmitted to and from all split friction disks 90, 95, In addition, cavity 48 limits the area of contact surfaces 92, which also damps vibration.

Performance variation of the brake assembly/heat sink. may be controlled through placement of one or more split friction disks 90, 95 in various locations within the brake assembly/heat sink, For instance, generally due to thermal expansion, a non-uniform pressure distribution within the brake assembly may be associated with a RTO. Split friction disks 90, 95 located within the brake assembly may combat this expansion and produce a brake assembly with an output torque of higher consistency.

With reference to FIGS. 7A-7C, exemplary axial and cross-sectional views of a split friction disk half and disk assembly are depicted.

With reference to FIGS. 8A-8C, exemplary axial and cross-sectional views of a split friction disk half and disk assembly are depicted. With respect to FIGS. 8A-8C elements with like element numbering as depicted in FIG. 7A-7C, are intended to be the same and will not be repeated for the sake of clarity. With continued reference to FIGS. 8A-8C the surface of the non-contact surface 95 may not be parallel to friction surface 56 (not shown). The surface of the non-contact surface 95 may be oriented in any desired angle, and comprise a curve or any desired shape. Additionally, the surface of the contact surfaces 93A, 93B may not be parallel to friction surface 56. The surface of the contact surfaces 93A, 93B may be oriented in any desired angle and/or combination of angles, and comprise a curve or any desired shape According to various embodiments, spacer material may be added to the cores 48 of any of the split disk and/or configurations disclosed herein. This spacer material may offer additional vibration damping. This spacer material may be a carbon/carbon spacer. Carbon fiber-reinforced carbon (aka carbon-carbon), is a composite material consisting of carbon fiber reinforcement in a matrix of graphite.

Solid friction disks may be referred to as "thick" or "thin" solid friction disks. In general, the rotor (rotatable friction disk 42) comprises a thick friction disks while a stator (non-rotatable friction disk 40) comprises thin friction disks; however, a rotor may comprise a thin friction disk while a stator may comprise a thick friction disk. As previously described, due to the high cost of the materials involved, such as the high cost of the carbon/carbon materials, reuse of materials may be important. For instance, thick friction disks may he used in the field within a braking system for a period of time, such as a first tour. A thick friction disk may be removed from service and then through machining be formed into a thin friction disk. This thin friction disk may be used in the field within a braking system for a period of time, such as a second tour. This thin friction disk may be removed from service and then through machining be formed into a split thick disk and/or half of a split thick disk. This thick split friction disk may be used in the field within a braking system for a period of time, such as a third tour. The thick split friction disk may be removed from service and through machining be formed into a thin split friction disk. This thin split friction disk may be used in the field within a braking system for a period of time, such as a fourth tour. Thus, a brake system which uses a variety of thin and thick and solid and split friction disks may extend the life span of the friction disks as these parts may be reused in other brake system applications, as compared with an all split disk brake system which may be limited to one or two tours.

As used herein, the phrases "make contact with", "touch", "interface with" and "engage" may be used interchangeably. Different cross-hatching is used throughout the figures to denote different parts but not necessarily to denote the same or different materials.

In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment, Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments, However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more," Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. As used herein, the term adjacent may mean in close proximity to, but does not necessarily require contact. No claim element herein is to he construed under the provisions of 35 U.S.C. 112, sixth paragraph, unless the element is expressly recited using the phrase "means for," As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A disk brake assembly comprising:
 a pressure plate coupled to a first rotor friction disk of a plurality of rotor friction disks;
 a plurality of stator friction disks located between the pressure plate and an end plate,
 wherein locations of the stator friction disks alternate with locations of the rotor friction disks, wherein at least one of the rotor friction disks and the stator friction disks is a split friction disk having an open cavity,
 wherein at least one of the rotor friction disks and the stator friction disks is a solid friction disk,
 wherein the split friction disk further comprises an annular-shaped disk half comprising:
  a friction surface; and
  a non-friction surface on a side opposite of the friction surface, the non-friction surface including:
   a first contact surface and a second contact surface; and
   a non-contact surface recessed from both the first contact surface and the second contact surface, wherein the first contact surface extends a greater distance axially away from the non-contact surface than does the second contact surface, wherein a surface of the non-friction surface and a surface of the fiction surface are non-parallel surfaces; and the end plate coupled to a second rotor friction disk of the plurality of rotor friction disks.

2. The disk brake assembly of claim 1, wherein a plurality of the split friction disks are positioned adjacent to at least one of the pressure plate and the end plate.

3. The disk brake assembly of claim 1, wherein a location of the split friction disk is selected to damp vibration within the disk brake assembly.

4. The disk brake assembly of claim 1, wherein a location of the split friction disk is selected to reduce performance variation of the disk brake assembly to within a preselected tolerance band.

5. The disk brake assembly of claim 1, wherein a plurality of solid friction disks are positioned adjacent to the end plate.

6. The disk brake assembly of claim 1, wherein at least one of a plurality of solid friction disks and a plurality of split friction disks are positioned adjacent to each other.

7. The disk brake assembly of claim 1, wherein selection of split friction disks and solid friction disks for use in the disk brake assembly which comprises at least one split friction disk and at least one solid friction disk is based on extending a lifespan of materials.

8. The disk brake assembly of claim 1, wherein the plurality of stator friction disks are at least one of split friction disks and solid friction disks.

9. The disk brake assembly of claim 1, wherein the plurality of rotor friction disks are at least one of split friction disks and solid friction disks.

10. The disk brake assembly of claim 1, wherein a spacer material is located within the open cavity of at least one split friction disk.

11. A method for assembling a brake assembly comprising:
positioning a plurality of stator friction disks between a pressure plate and an end plate;
positioning a plurality of rotor friction disks between the pressure plate and the end plate,
wherein the location of the rotor friction disks alternate with the location of the stator fiction disks, wherein at least one of the rotor friction disks and the stator friction disks is a split friction disk having an open cavity,
wherein at least one of the rotor friction disks and the stator friction disks is a solid friction disk, and
wherein the split friction disk further comprises an annular-shaped disk half comprising:
a friction surface; and
a non-friction surface on a side opposite of the friction surface, the non-friction surface including:
a first contact surface and a second contact surface; and
a non-contact surface recessed from both the first contact surface and the second contact surface, wherein the first contact surface extends a greater distance axially away from the non-contact surface than does the second contact surface, wherein a surface of the non-friction surface and a surface of the fiction surface are non-parallel surfaces; and the end plate coupled to a second rotor friction disk of the plurality of rotor friction disks.

12. The method of claim 11, wherein at least one of a plurality of split friction disks and a plurality of solid friction disks are positioned adjacent to at least one of the pressure plate and the end plate.

13. The method of claim 11, wherein a spacer material is located within the open cavity of at least one split friction disk.

14. The method of claim 11, wherein the plurality of stator friction disks are at least one of split friction disks and solid friction disks.

15. The method of claim 11, wherein the plurality of rotor friction disks are at least one of split friction disks and solid friction disks.

16. The method of claim 11, wherein a location of the split friction disk is selected to damp vibration within the brake assembly.

17. A wheel assembly comprising:
a disk brake assembly, wherein the disk brake assembly comprises:
a pressure plate coupled to a first rotor friction disk of a plurality of rotor friction disks;
a plurality of stator friction disks located between the pressure plate and an end plate, wherein locations of the stator friction disks alternate with locations of the rotor friction disks, wherein at least one of the rotor friction disks and the stator friction disks is a split friction disk having an open cavity,
wherein at least one of the rotor friction disks and the stator friction disks is a solid friction disk; and the end plate coupled to a second rotor friction disk of the plurality of rotor friction disks, and
wherein the split friction disk further comprises an annular-shaped disk half comprising:
a friction surface; and
a non-friction surface on a side opposite of the friction surface, the non-friction surface including:
a first contact surface and a second contact surface; and
a non-contact surface recessed from both the first contact surface and the second contact surface, wherein the first contact surface extends a greater distance axially away from the non-contact surface than does the second contact surface, wherein a surface of the non-friction surface and a surface of the fiction surface are non-parallel surfaces; and the end plate coupled to a second rotor friction disk of the plurality of rotor friction disks.

* * * * *